US012559236B2

(12) United States Patent 
Gonzalez

(10) Patent No.: US 12,559,236 B2 
(45) Date of Patent: Feb. 24, 2026

(54) AEROSPACE GALLEY INSERT COMPRISING OVEN

(71) Applicant: B/E Aerospace, Inc., Winston Salem, NC (US)

(72) Inventor: Arnau Castillo Gonzalez, Maarssen (NL)

(73) Assignee: B/E AEROSPACE, INC., Winston-Salem, NC (US)

( * ) Notice: Subject to any disclaimer, the term of this patent is extended or adjusted under 35 U.S.C. 154(b) by 292 days.

(21) Appl. No.: 17/751,783

(22) Filed: May 24, 2022

(65) Prior Publication Data

US 2022/0411067 A1 Dec. 29, 2022

(30) Foreign Application Priority Data

Jun. 28, 2021 (EP) .................................... 21182203

(51) Int. Cl. 
 B64D 11/04 (2006.01) 
 A21B 3/04 (2006.01) 
 (Continued)

(52) U.S. Cl. 
 CPC .............. B64D 11/04 (2013.01); A21B 3/04 (2013.01); A23L 5/17 (2016.08); G01N 25/18 (2013.01); 
 (Continued)

(58) Field of Classification Search 
 CPC . A23L 5/17; A21B 3/04; G01N 25/18; G01N 25/56; F28F 21/086; F28D 15/04 
 See application file for complete search history.

(56) References Cited

U.S. PATENT DOCUMENTS 4,557,413 A * 12/1985 Lewis .................. B23K 20/227 
                                                      228/183 
5,272,963 A * 12/1993 Del Fabbro .............. A21B 3/04 
                                                      219/400 
(Continued)

FOREIGN PATENT DOCUMENTS

DE      102017105353 A1      9/2017 
WO         2007042168 A1      4/2007 
WO      WO-2020074476 A1 *   4/2020

OTHER PUBLICATIONS

Abstract of DE102017105353, Published Sep. 28, 2017, 1 page. 
(Continued)

*Primary Examiner* — Steven W Crabb 
*Assistant Examiner* — Dilnessa B Belay 
(74) *Attorney, Agent, or Firm* — CANTOR COLBURN LLP

(57) ABSTRACT

An aerospace galley insert includes an oven defining therein an oven inner cavity for receiving food to be prepared and a fluid supply for supplying fluid comprising water or water vapour to the oven inner cavity. The galley also includes an exterior space, a heat pipe extending between the cavity and the exterior space, a first temperature sensor for detecting a first temperature in the cavity, a second temperature sensor for detecting a second temperature in the exterior space, and a third temperature sensor for detecting a third temperature of the heat pipe where it extends into the exterior space. The system also includes a control unit configured to determine an actual water vapour concentration in the oven inner cavity based on the first, second and third temperatures, and configured to control the fluid supply in order to adjust the actual water vapour concentration to a target water vapour concentration.

13 Claims, 5 Drawing Sheets

(51) Int. Cl.

| | |
|---|---|
| *A23L 5/10* | (2016.01) |
| *F28D 15/04* | (2006.01) |
| *F28F 21/08* | (2006.01) |
| *G01N 25/18* | (2006.01) |
| *G01N 25/56* | (2006.01) |

(52) U.S. Cl.
CPC .......... *G01N 25/56* (2013.01); *A23V 2002/00* (2013.01); *F28D 15/04* (2013.01); *F28F 21/086* (2013.01)

(56) References Cited

U.S. PATENT DOCUMENTS

| | | | |
|---|---|---|---|
| 8,348,500 B2 | 1/2013 | Sakami | |
| 10,481,078 B2 | 11/2019 | Yamauchi | |
| 2007/0240857 A1 * | 10/2007 | Hou ..................... | F28D 15/046 165/104.26 |
| 2010/0224616 A1 | 9/2010 | Yasuhara | |
| 2012/0160111 A1 | 6/2012 | Hozumi et al. | |
| 2018/0299138 A1 * | 10/2018 | Faraldi ................ | F24C 15/2007 |

OTHER PUBLICATIONS

Castillo Gonzalez, Prior to Aug. 2017 (pre filing), Summary of Information about CN Prior Art, one page.
European Search Report for Application No. 21182203.6, mailed Dec. 23, 2021, 7 pages.

* cited by examiner

AEROSPACE GALLEY INSERT COMPRISING OVEN

CROSS REFERENCE TO RELATED APPLICATIONS

This application claims priority to European Patent Application No. 21182203.6 filed Jun. 28, 2021, the entire contents of which is incorporated herein by reference.

TECHNICAL FIELD

This disclosure relates to an aerospace galley insert comprising an oven, and a method of managing water vapour concentration in an oven of an aerospace galley insert.

BACKGROUND

Aircraft can be equipped with steam ovens for cooking or heating food for passengers of the aircraft. Steam ovens are typically provided as part of a galley insert which enables easy installation and removal of the oven from an aircraft galley. The food is heated in an inner cavity of the oven using steam. The steam can be provided by supplying water to the oven and heating the water within the oven to evaporate it, or by injecting steam into the oven directly.

Factors which affect the cooking process within the steam oven include temperature, pressure and humidity. Whilst temperature and pressure are relatively easy to measure and control, humidity is more challenging. Conventional humidity sensors, e.g., those which use capacitive measurement to determine the amount of moisture in the air, can be fragile and may become easily damaged if used in an oven of an aerospace galley insert. In addition, they may not be suited to the extreme conditions experienced within ovens, such as wide temperature ranges, exposure to cleaning chemicals, corrosion by food spices, etc.

SUMMARY

According to one aspect of the present disclosure there is provided an aerospace galley insert comprising: an oven defining therein an oven inner cavity for receiving food to be prepared; a fluid supply for supplying fluid comprising water or water vapour to the oven inner cavity; an exterior space defined outside of the oven inner cavity; a heat pipe extending between the oven inner cavity and the exterior space; a first temperature sensor for detecting a first temperature in the oven inner cavity; a second temperature sensor for detecting a second temperature in the exterior space; a third temperature sensor for detecting a third temperature of the heat pipe where it extends into the exterior space; and a control unit configured to determine an actual water vapour concentration in the oven inner cavity based on the first, second and third temperatures, and configured to control the fluid supply in order to adjust the actual water vapour concentration to a target water vapour concentration.

In an optional example, the target water vapour concentration is a water vapour molar fraction of at least 45%. The target water vapour concentration may be a water vapour molar fraction of at least 55%. The target water vapour concentration may be a water vapour molar fraction of at least 60%. The target water vapour concentration may be a water vapour molar fraction of 45-75%. The target water vapour concentration may be a water vapour molar fraction of 55-75% or 60-75% or 45-60% or 45-55%.

In an optional example, the control unit is configured to adjust the actual water vapour concentration based on a measured ambient air pressure. Optionally, the control unit comprises an air pressure sensor for measuring the air pressure in the exterior space and so provide the measured ambient air pressure.

The heat pipe may optionally comprise titanium at least where the heat pipe extends in the oven inner cavity.

In an optional example, the control unit is configured to determine the actual water vapour concentration in the oven inner cavity based on a measured water vapour concentration in the exterior space. The control unit may optionally comprise a water vapour concentration sensor for measuring the water vapour concentration in the exterior space and so provide the measured water vapour concentration.

The heat pipe may optionally comprise a first leg extending between the oven inner cavity and the exterior space, and a second leg extending in the exterior space and joined to the first leg by a bent portion. The second leg may extend at least partly upwardly from the bent portion. The third temperature sensor may optionally be arranged to measure the temperature at the bent portion of the heat pipe.

In an optional example, a minority of the heat pipe is located in the oven inner cavity. In some examples, no more than 20% of the length of the heat pipe is located in the oven inner cavity.

Optionally, the heat pipe comprises a wick.

An aspect of the present disclosure provides a method of managing water vapour concentration in an oven of an aerospace galley insert, the oven defining therein an oven inner cavity for receiving food to be prepared, and the aerospace galley insert having a heat pipe extending between the oven inner cavity and an exterior space defined outside of the oven inner cavity, the method comprising: detecting a first temperature in the oven inner cavity; detecting a second temperature in the exterior space; detecting a third temperature of the heat pipe where it extends into the exterior space; determining an actual water vapour concentration in the oven inner cavity based on the first, second and third temperatures; and controlling a fluid supply to the oven inner cavity in order to adjust the actual water vapour concentration to a target water vapour concentration, the fluid comprising water or water vapour.

In an optional example, the target water vapour concentration is a water vapour molar fraction of at least 45%. The target water vapour concentration may be a water vapour molar fraction of at least 55%. The target water vapour concentration may be a water vapour molar fraction of at least 60%. The target water vapour concentration may be a water vapour molar fraction of 45-75%. The target water vapour concentration may be a water vapour molar fraction of 55-75% or 60-75% or 45-60% or 45-55%.

In an optional example, the method comprises measuring an ambient air pressure and adjusting the actual water vapour concentration based on the measured ambient air pressure. Optionally, the control unit comprises an air pressure sensor for measuring the air pressure in the exterior space and so provide the measured ambient air pressure.

The heat pipe may optionally comprise titanium at least where the heat pipe extends in the oven inner cavity.

In an optional example, the method comprises measuring a water vapour concentration in the exterior space, and determining the actual water vapour concentration in the oven inner cavity based on the measured water vapour concentration in the exterior space. The control unit may optionally comprise a water vapour concentration sensor for measuring the water vapour concentration in the exterior space and so provide the measured water vapour concentration.

The heat pipe may optionally comprise a first leg extending between the oven inner cavity and the exterior space, and a second leg extending in the exterior space and joined to the first leg by a bent portion. The second leg may extend at least partly upwardly from the bent portion. The third temperature may be the temperature of the bent portion of the heat pipe.

In an optional example, a minority of the heat pipe is located in the oven inner cavity. In some examples, no more than 20% of the length of the heat pipe is located in the oven inner cavity.

Optionally, the heat pipe comprises a wick.

An aspect of the present disclosure provides a method of managing water vapour concentration in a steam oven of an aerospace galley insert as disclosed herein.

BRIEF DESCRIPTION OF DRAWINGS

Certain embodiments of the disclosure will now be described, by way of example only, and with reference to the accompanying drawings.

DETAILED DESCRIPTION

Figure 1:
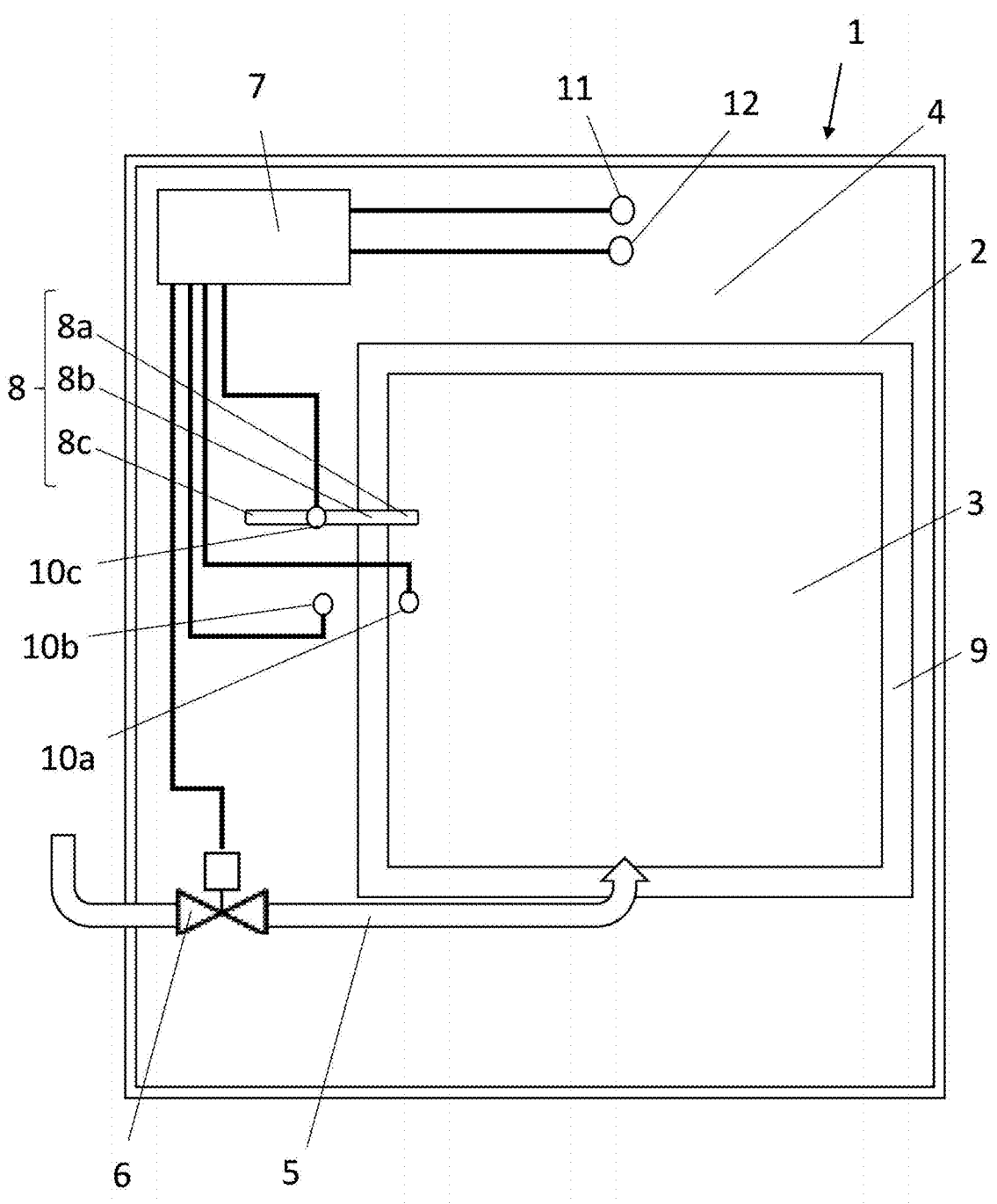
FIG. 1 shows a schematic view of an aerospace galley insert according to an embodiment of the disclosure.

FIG. 1 shows a schematic diagram of an example of an embodiment of the present disclosure. The Figure shows an aerospace galley insert 1 comprising an oven 2 defining therein an oven inner cavity 3 for receiving food for heating or cooking. An exterior space 4 is defined outside of the oven inner cavity 3 and within the aerospace galley insert 1. The exterior space 4 may be at an ambient temperature and pressure of a space in which the aerospace galley insert 1 is located. In some examples, the aerospace galley insert 1 is located in an aircraft galley, and the exterior space 4 is approximately at the cabin air pressure and cabin temperature of the aircraft.

The aerospace galley insert 1 comprises a fluid supply 5 for providing fluid comprising water or water vapour, i.e. steam, to the oven inner cavity 3. In some examples, the fluid supply 5 can provide water vapour directly to the oven inner cavity 3 from an exterior water vapour source. In other examples, the fluid supply 5 can provide water to a heating element (not shown) located inside the oven inner cavity 3, wherein the water is evaporated using the heating element to create water vapour. The water vapour is used to transfer heat to the food within the oven inner cavity 3. One or more valves 6 are provided to control the flow of water or water vapour to the oven inner cavity 3 and thereby control the amount of water vapour inside the oven inner cavity 3.

The aerospace galley insert 1 further comprises a control unit 7. The control unit 7 is configured to control the fluid supply 5 to the oven inner cavity 3. In this example, the control unit 7 is configured to control the valve 6 that regulates the flow of water or water vapour to the oven inner cavity 3. For instance, the control unit 7 can increase the amount of water vapour in the oven 2 by opening the valve 6, and decrease the amount of water vapour in the oven 2 by closing the valve 6. The control unit 7 may be configured to control other operations of the oven 2 as well, e.g. the internal oven temperature and/or pressure.

A heat pipe 8 is partially disposed inside the oven inner cavity 3. The heat pipe 8 extends between the oven inner cavity 3 and the exterior space 4. The heat pipe 8 may be understood as having a first portion 8a located inside the oven inner cavity 3, a second portion 8b extending through a wall 9 of the oven inner cavity 3, and a third portion 8c located in the exterior space 4. In this embodiment, the heat pipe 8 is substantially straight.

In this example, the heat pipe 8 is positioned such that a minority of the heat pipe 8 is located in the oven inner cavity 3, i.e. the first portion 8a is a minority of the length of the heat pipe 8. A minority of the heat pipe 8 may be less than half of the length of the heat pipe 8. In some examples, no more than 40% of the length of the heat pipe 8 is located in the oven inner cavity 3, or no more than 30%, or no more than 20%, or no more than 10%. A smaller proportion of the length of the heat pipe 8 being located in the oven inner cavity 3 may decrease the likelihood of damage occurring to the heat pipe 8 such as during insertion and removal of food, cleaning of the oven inner cavity 3, etc.

When a heat pipe 8 is positioned to extend partially into an oven 2, the temperature measured on the heat pipe 8 at a particular oven temperature and ambient temperature changes depending on the water vapour concentration inside the oven 2. This is because when the water vapour concentration changes, so does the thermal conductivity of the gas inside the oven 2, thus affecting the ability of the heat pipe to transfer heat from the oven 2 along the heat pipe 8. Therefore, the heat pipe 8 can be used to estimate the water vapour concentration in the oven 2 by measuring the temperature of the heat pipe 8 and relating the temperature measurement to the water vapour concentration. The heat pipe can therefore be configured as a water vapour concentration sensor.

The aerospace galley insert 1 comprises a plurality of temperature sensors 10n for detecting the temperature of various parts of the aerospace galley insert 1. A first temperature sensor 10a is arranged to detect a first temperature in the oven inner cavity 3. A second temperature sensor 10b is arranged to detect a second temperature in the exterior space 4, which may be an ambient temperature (e.g. a cabin temperature). A third temperature sensor 10c is arranged to detect a third temperature of the heat pipe 8 where it extends into the exterior space, i.e. the temperature of the third portion 8c. Other temperature sensors may be provided.

The control unit 7 is in electrical communication with the temperature sensors 10n to receive sensor data therefrom. The control unit 7 is configured to process the sensor data to determine an actual water vapour concentration inside the oven inner cavity 3 based on the temperature data from the three temperature sensors 10a, 10b, 10c.

The water vapour concentration is a measure of the amount or proportion of water vapour in the oven inner cavity 3 and is related to the humidity of the oven inner cavity 3. Relative humidity (RH) is the ratio of the partial pressure of water vapour to the equilibrium vapour pressure of water at a given temperature. Relative humidity depends on the temperature and the pressure of the system of interest, i.e. of the oven inner cavity 3. In some examples, the water vapour concentration may be expressed in terms of absolute or relative humidity. The water vapour concentration may alternatively be expressed in terms of molar fractions, which has the benefit that it does not depend on temperature or pressure of the system. The molar fraction is the ratio of the number of moles of one component of a solution or mixture (e.g. water vapour molecules in the oven) to the total number of moles representing all of the components (e.g. water vapour molecules plus air molecules in the oven).

In the example shown in FIG. 1, the aerospace galley insert 1 further comprises an air pressure sensor 11 for measuring the air pressure in the exterior space 4. The air pressure may be an ambient air pressure, e.g. a cabin air pressure. The aerospace galley insert 1 further comprises a water vapour concentration sensor 12 for measuring the water vapour concentration in the exterior space 4. The air pressure sensor 11 and/or the water vapour concentration sensor 12 may be of conventional design. Since the water vapour concentration sensor 12 is not located inside the oven inner cavity, and hence is not exposed to such harsh conditions and is less likely to be damaged, a conventional humidity sensor may be suitable. The control unit 7 is in electrical communication with the air pressure sensor 11 and the water vapour concentration sensor 12 to receive sensor data therefrom.

In some embodiments, the control unit 7 is configured to determine the actual water vapour concentration inside the oven inner cavity 3 based on the sensor data from the air pressure sensor 11 and/or the water vapour concentration sensor 12. Using these measurements in addition to the temperature measurements may increase the accuracy of the water vapour concentration estimation.

The control unit 7 is configured to control the fluid supply 5 in order to adjust the actual water vapour concentration to a target water vapour concentration. For instance, if the actual water vapour concentration is lower than the target water vapour concentration, the control unit 7 may cause the valve 6 to open to allow more water or water vapour to enter the oven inner cavity 3. Conversely, if the actual water vapour concentration is higher than the target water vapour concentration, the control unit 7 may cause the valve 6 to close to decrease the water or water vapour entering the oven inner cavity 3. The control unit 7 may also vent some water vapour from the oven inner cavity 3 to decrease the actual water vapour concentration.

In embodiments in which the air pressure and/or the water vapour concentration in the exterior space 4 is measured, the control unit 7 may be configured to adjust the actual water vapour concentration to the target water vapour concentration based on the measured air pressure and/or the measured water vapour concentration in the exterior space 4.

Achieving or maintaining a target in the oven inner cavity 3 may improve the cooking or heating of the food. If the water vapour concentration in the oven inner cavity 3 is too low, too much water may transpire out of the food during cooking, leading to a lower food quality. On the other hand, if the water vapour concentration is too high, the ability of the air to transfer heat to the food may decrease because steam cannot transfer heat as well as air, thus increasing cooking time.

In some examples, the target water vapour concentration is at least 45% molar fraction of water vapour (i.e., at least 45% of the total of 'air molecules plus water vapour molecules' are water vapour molecules). In some examples, the target water vapour concentration is at least 55% molar fraction of water vapour. In some examples, the target water vapour concentration is at least 60% molar fraction of water vapour. In some examples, the target water vapour concentration is 45-75% molar fraction of water vapour. Other target water vapour concentrations may be selected, e.g. depending on the parameters of the system such as cooking temperature and pressure.

The inventors have found that 60% molar fraction of water vapour is the minimum fraction at which no transpiration occurs from food being cooked at 130° C. and 1 bar (100000 Pa) pressure. Lower cooking pressures have been found to require a higher minimum water vapour molar fraction to prevent transpiration. For instance, at an altitude of 8000 feet and a corresponding pressure of around 75300 Pa, the minimum water vapour fraction at which no transpiration occurs has been found to be around 75%. Thus, a target molar fraction of water vapour of at least 55% or at least 60% may decrease or prevent transpiration when cooking food within an oven of a galley insert on an aircraft at both sea level and high altitudes.

The inventors have also found that an increase in water vapour molar fraction above 40% significantly increases the cooking time due to the negative impact of water vapour on heat transfer. Compromising between the heat transfer and transpiration whilst reducing the impact on both factors, the inventors found an ideal molar fraction for avoiding meal transpiration of 45% or higher at 0 feet altitude (i.e. sea level), and of 60% or higher at 8000 feet altitude; and an ideal molar fraction for limiting the reduction of heat transfer of 55% or lower (largely independently of altitude). Thus, as a balance of these factors, the target water vapour molar fraction may be 50-60%.

However, in embodiments, water vapour (steam) is not injected for an initial portion of a cooking cycle, and is injected after that initial portion. In embodiments, water vapour (steam) is not injected into the oven for around a quarter of a cooking cycle, in particular the first quarter of a cooking cycle. This is because, for instance, if steam were injected during the first 5 minutes of a 20 minute cooking cycle before the food has heated sufficiently, the steam would condense on the meals and cause inefficient cooking. Additionally, it takes some time for the oven to reach the set-up temperature. The inventors have found that, as a result of this, the target molar fraction of water vapour can be increased (compared to the theoretical optimum) to further decrease or prevent transpiration from the meals without affecting the cooking time. Thus, the target water vapour molar fraction may be 60-70%.

The heat pipe 8 may optionally comprise metal material which is beneficial to the good thermally conductive properties of metal. For instance, the heat pipe may comprise steel, stainless steel, copper, etc. The first portion 8a of the heat pipe 8 may be exposed to more harsh conditions compared to the third portion 8c of the heat pipe 8 located in the exterior space 4. The heat pipe 8 may therefore include materials which are more robust and/or more resistant to corrosion at least where the heat pipe 8 extends into the oven inner cavity 3, i.e. at least at the first portion 8a. In one example, the heat pipe comprises titanium at least where the heat pipe extends in the oven inner cavity. Titanium may be less prone to corrosion and/or more robust than some other materials and hence more suited to enduring the conditions in the oven.

Figure 2:
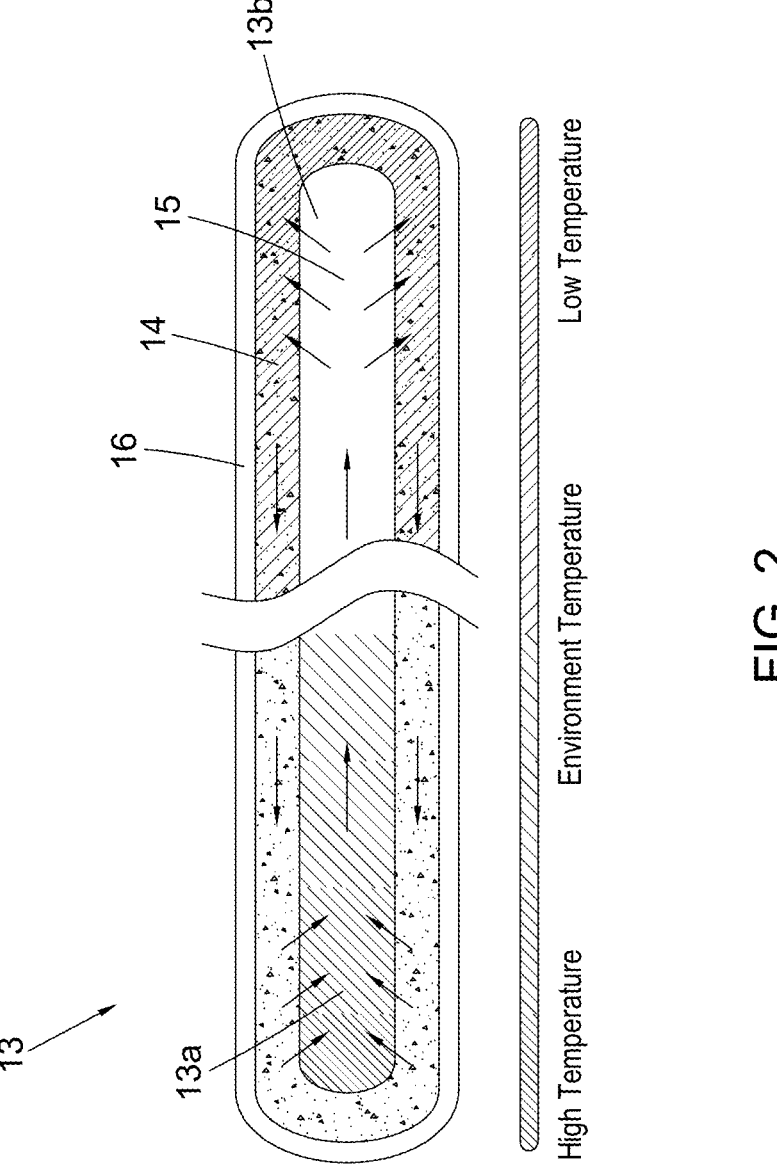
FIG. 2 shows a diagram of a conventional heat pipe.

FIG. 2 shows a conventional heat pipe 13. Heat pipes are commonly used for transferring heat from a region of relatively high temperature to a region of relatively low temperature. Heat pipes utilise the principle of phase changes to transfer heat. The heat pipe 13 comprises a wick 14 surrounding a vapour cavity 15 and disposed inside a casing 16. Inside the heat pipe 13 is a working fluid. When a first end 13*a* of the heat pipe 13 is heated, the working fluid in the wick 14 will evaporate in the vapour cavity 15, absorbing thermal energy. The working fluid vapour will then migrate along the vapour cavity 15 to a second end 13*b* of the heat pipe 13 which is at a relatively low temperature compared to the first end, where the vapour will condense to liquid again. The liquid will flow back to the first end 13*a*, e.g. by the action of gravity or by the use of a capillary material in the wick 14. This cycle then repeats, causing heat to be transferred from the heated first end 13*a* to the non-heated second end 13*b*.

The heat pipe 13 may be used in embodiments of the present disclosure for estimating the water vapour concentration inside an oven of an aerospace galley insert. For instance, the heat pipe 13 may be used as heat pipe 8 in the aerospace galley insert 1 of FIG. 1. In such examples, the first end 13*a* is located in the oven inner cavity 3, and the second end 13*b* is located in the exterior space 4 of the aerospace galley insert 1.

In other examples, the heat pipe 8 in the aerospace galley insert 1 may be another type of heat pipe, such as a wickless heat pipe.

An advantage of using a heat pipe as a water vapour concentration sensor is that heat pipes tend to be more robust than conventional humidity sensors and therefore may be more able to withstand harsh conditions in the oven inner cavity 3, e.g. extreme temperatures, cleaning chemicals, food spices, etc. Therefore, ovens which previously were unsuited for the inclusion of conventional humidity sensors due to the likelihood of damage thereto may be suitable for including a heat pipe humidity sensor. This allows water vapour concentration to be a known variable in the cooking process, which can then be controlled to a desired level. In addition, heat pipes may require less maintenance than traditional humidity sensors, which is particularly beneficial in an aerospace oven context where such maintenance is difficult to perform.

Figure 3:
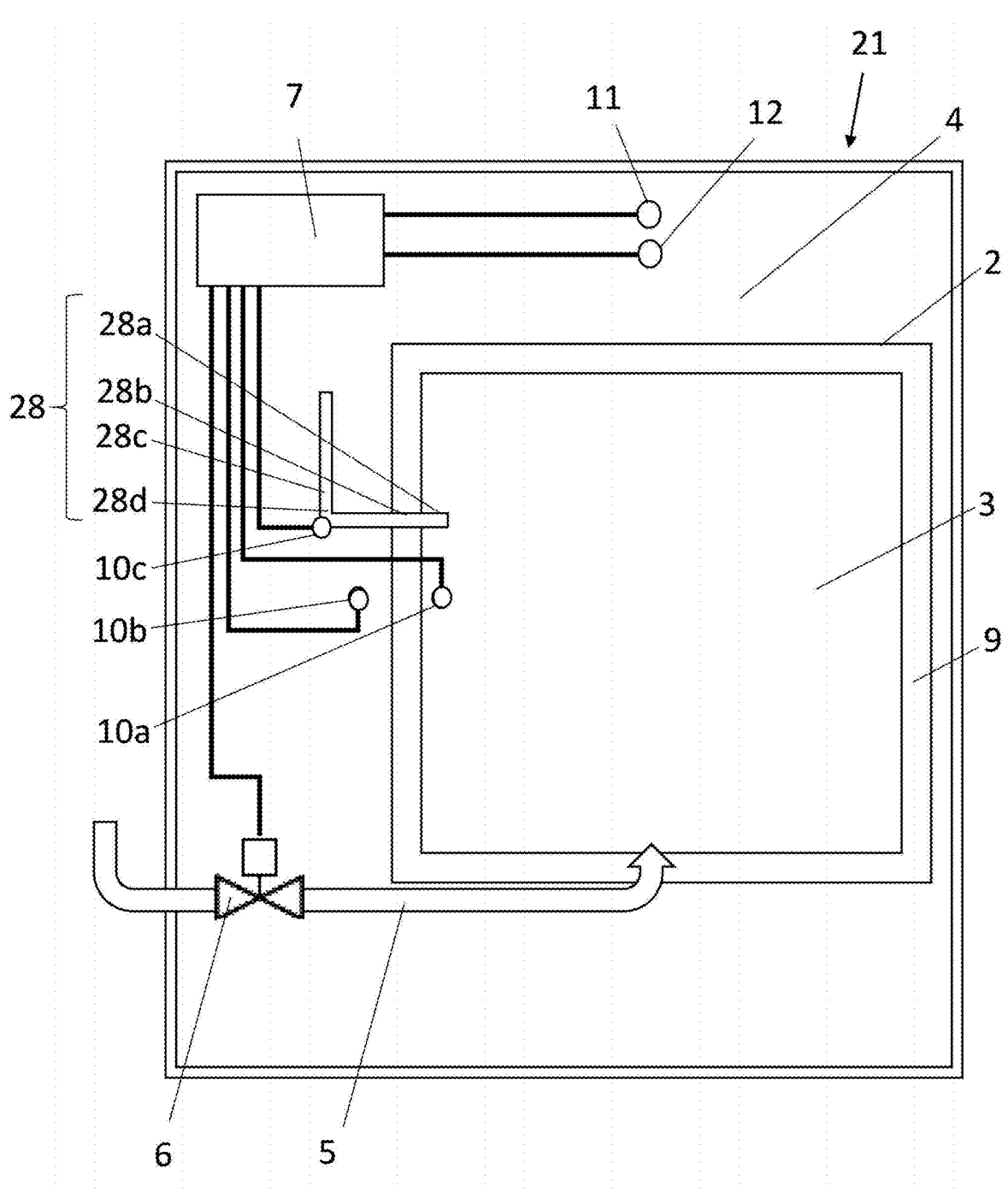
FIG. 3 shows a schematic view of an aerospace galley insert according to an embodiment of the disclosure.

FIG. 3 shows an example of a second embodiment of the present disclosure. The Figure shows an aerospace galley insert 21 which is similar to the aerospace galley insert 1 of FIG. 1, except that aerospace galley insert 21 includes a heat pipe 28 comprising a bent portion 28*d*. Like reference numerals are used to depict like elements between FIG. 1 and FIG. 3.

Similarly to the heat pipe 8 in FIG. 1, heat pipe 28 includes a first portion 28*a* located in the oven inner cavity 3, a second portion 28*b* extending through a wall 9 of the oven inner cavity 3, and a third portion 28*c* located in the exterior space 4. The bent portion 28*d* is part of the third portion 28*c* of the heat pipe 28. The heat pipe 28 comprises a first leg and a second leg which are substantially straight, the first leg and the second leg being joined by the bent portion 28*d*. The first leg includes the first portion 28*a*, the second portion 28*b*, and part of the third portion 28*c*, and the second leg includes the remainder of the third portion 28*c*.

The third temperature sensor 10*c* is arranged to measure the temperature at the bent portion 28*d* of the heat pipe 28. This is beneficial because at both ends of the heat pipe 28 there will be phases changes of the working fluid within the heat pipe 28, while at the bent portion 28*d* there will always be a liquid phase, and measuring the temperature of the liquid phase is more reliable than measuring at a phase change.

The second leg extends at least partly upwardly from the bent portion 28*d*, e.g. at least partly upwardly when considering the oven in normal use in an aerospace galley. In this example, the second leg extends substantially vertically upwards from the bent portion 28*d* at an angle of around 90 degrees from the first leg. In some examples the angle between the first leg and the second leg may be a maximum of 160 degrees. For instance, the angle may be within the range of 90-160 degrees, 90-150 degrees, 90-140 degrees, 90-130 degrees, 90-120 degrees, 90-110 degrees, or 90-100 degrees. The second leg extending at least partly upwardly allows gravity to assist the flow of liquid working fluid within the heat pipe 28 towards the bent portion 28*d*, and hence towards the temperature sensor 10*c* to obtain a more reliable temperature reading.

Referring to FIGS. 1 and 3, the relationship between temperature in the aerospace galley insert 1, 21 (e.g. temperature of the heat pipe 8, 28, temperature in the oven 2, and ambient temperature) and water vapour concentration in the oven inner cavity 3 may be determined e.g. from first principles or empirically. The relationship information may be stored in a look-up table which is accessible by the control unit 7. In such examples, the control unit 7 may receive the temperature sensor data from the three temperature sensors 10*a*, 10*b*, 10*c*, and estimate the actual water vapour concentration in the oven inner cavity 3 by using the look-up table to associate the temperature measurements with a corresponding estimated water vapour concentration.

Figure 4:
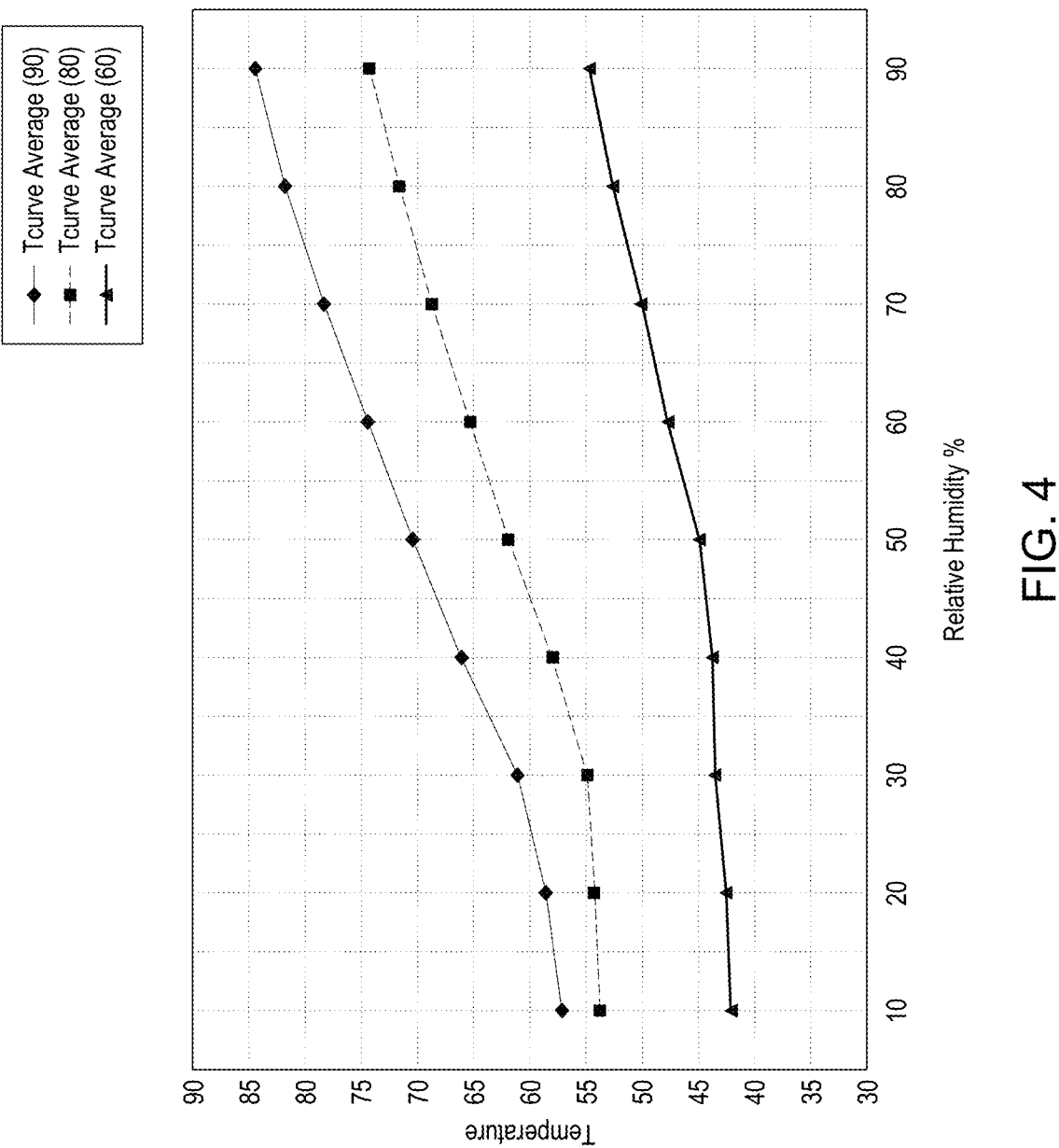
FIG. 4 shows a graph of relative humidity inside an oven versus temperature measured on a heat pipe extending partially inside the oven, the results being measured at three pre-set temperatures of the oven.

FIG. 4 shows a graph of the results of an experiment to investigate the relationship between temperature of a heat pipe and relative humidity in an oven. In the experiment, a heat pipe was arranged to extend partially inside a climate chamber representing an oven (and heretofore referred to as an oven). The oven was set to a specific temperature and relative humidity. The heat pipe comprised a bent portion located outside the oven, and a thermal sensor was placed at the bent portion to monitor the temperature thereof. The humidity inside the oven was then increased in 10% increments, with the temperature of the heat pipe being measured periodically as the humidity was increased. The temperature of the heat pipe was then plotted as a function of humidity. The experiment was repeated with the oven set at three different temperatures (60, 80 and 90 degrees Celsius).

As shown in the graph, at lower humidity (e.g. 10-30%) there is a small amount of increase in temperature of the heat pipe with increasing humidity. As humidity increases further, the temperature of the heat pipe increases more steeply. Thus, even though the temperature of the oven was approximately constant, the temperature of the heat pipe increased with increasing humidity inside the oven. As mentioned previously, this is thought to be due to the changing thermal conductivity of the gas as humidity changes.

These results demonstrate that there is a correlation between the heat pipe temperature and the relative humidity. Furthermore, the relationship can be quantified using these results so that heat pipe temperature measurements can be used to estimate relative humidity, e.g. in the context of a steam oven in an aerospace galley insert in accordance with the present disclosure.

In this example, a quadratic curve was fitted to the steeper part of the curves shown in FIG. 4. A general quadratic relationship can be expressed as:

$$y=ax^2+bx+c \tag{1}$$

where a, b and c are unknown variables, y is the temperature of the heat pipe at the bent portion, and x is the humidity step per 10%:

$$x = \frac{\text{Relative humidity}}{10} \tag{2}$$

By using curve fitting of the graph in FIG. 4, the parameters a, b and c were determined for each oven temperature setting (i.e. 60 degrees, 80 degrees and 90 degrees). In this example, the following polynomials were found:

$$60° \text{ C.setting:} y = -0,0,849 \cdot x^2 3,6292 \cdot x + 28,901$$

$$80° \text{ C.setting:} y = -0,1535 \cdot x^2 + 5,2487 \cdot x + 39,447$$

$$90° \text{ C.setting:} y = -0,1871 \cdot x^2 + 6,1456 \cdot x + 44,403 \quad (3)$$

Next, two of these equations were combined by subtracting the 60 degree equation from the 90 degree equation. This resulted in the following equation:

$$y = 0.1022 \cdot x^2 + 2.5164 \cdot x + 15.502 \quad (4)$$

This equation is then the delta for an increase in oven temperature of 30 degrees Celsius. In theory, the delta for a 10 degrees Celsius increase can be obtained by dividing this formula by 3:

$$y = \frac{-0.1022}{3} \cdot x^2 + \frac{2.5164}{3} \cdot x + \frac{15.502}{3} = -0.0340667 \cdot x^2 + \quad (5)$$

$$0.8388 \cdot x + 5.1673$$

This means that a formula can be created to calculate the temperature of the bent portion of the heat pipe, with reference to e.g. the known 90 degree setting. This can be done by applying the following factor for each of the parameters:

$$\text{Parameter}_{Toven} = \text{Parameter}_{90°C} - \frac{90 - Toven}{10} \cdot \text{Parameter}_{delta} \quad (6)$$

where $\text{Parameter}_{Toven}$ is the parameter at a particular oven temperature, $\text{Parameter}_{90° C.}$ is the corresponding parameter at the 90 degree setting from equation (3), Toven is the oven temperature, and $\text{Parameter}_{delta}$ is the corresponding parameter in equation (5).

Thus, inputting the known quantities, expressions for the parameters depending on the oven temperature can be created:

$$a = \left(-0.1871 - \left(\frac{90 - Toven}{10} * -0.0340667\right)\right) \quad (7)$$

$$b = \left(6.1456 - \left(\frac{90 - Toven}{10} * 0.8388\right)\right)$$

$$c = \left(44.403 - \left(\frac{90 - Toven}{10} * 5.1673\right)\right)$$

By reversing equations 1 and 2, a formula for determining the relative humidity based on measuring the temperature of the heat pipe can be created:

$$\text{Relative humidity} = \frac{-b - \sqrt{b^2 - 4 * a * c}}{2 * \alpha} * 10 \quad (8)$$

where a, b and c are given by equations (7).

Using equations 1, 7 and 8, a graph can be plotted which estimates the relative humidity in the oven, based on measurements of the temperature of the heat pipe and the oven. This graph is shown in FIG. 5, which depicts the temperature of the oven ("Toven") against the temperature of the heat pipe at the bent portion ("Tcurve") at various relative humidity levels RH 10, RH 20, . . . , RH 90.

Figure 5:
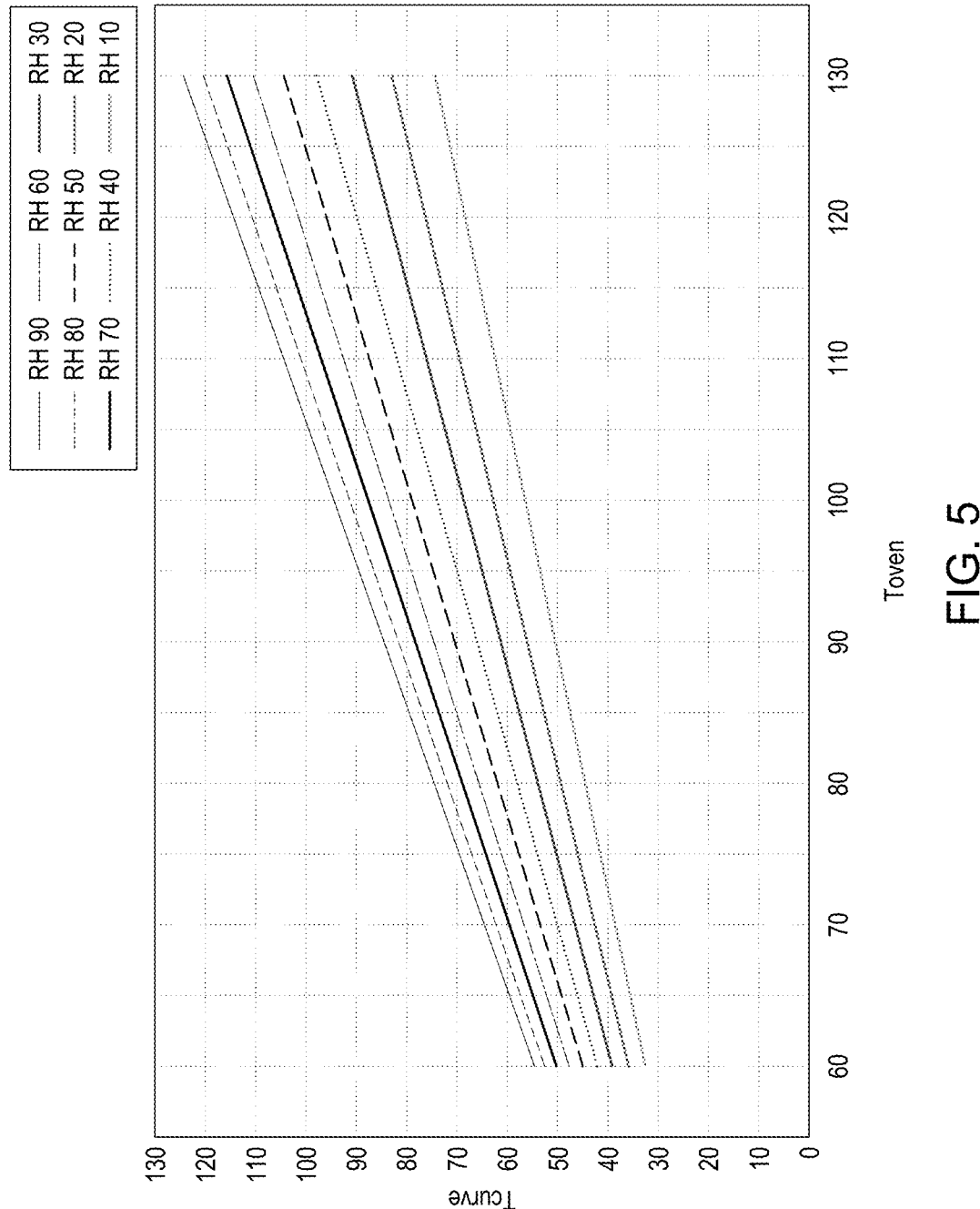
FIG. 5 shows a graph which relates temperature of an oven to temperature of a heat pipe extending partially inside the oven at various humidity levels of the oven.

For instance, using the graph of FIG. 5, it can be seen that an oven temperature reading of 100 degrees Celsius and a heat pipe temperature reading of 80 degrees Celsius corresponds to an estimated relative humidity of around 50.

When implemented in an aerospace galley insert comprising an oven, e.g. as shown in FIGS. 1 and 3, the known relationship between heat pipe temperature and oven temperature can be used to estimate the actual water vapour concentration inside the oven inner cavity, and then the fluid supply can be controlled based upon the estimation to achieve a target water vapour concentration. For instance, the data represented in FIG. 5 can be stored in a look-up table, and the control unit 7 can determine the actual humidity of the oven inner cavity 3 by receiving the temperature measurements from the temperature sensors 10a, 10c and finding the corresponding humidity in the look-up table. Humidity can then be related to molar fraction of water vapour, which may be a more useful way of representing the level of steam within the steam oven.

The experiment of FIGS. 4 and 5 did not take into account ambient temperature, as this was assumed to be constant. However, empirical data can be gathered with ambient temperature as another variable, so that the estimated humidity or water vapour concentration determination is additionally based on the ambient temperature reading. Thus, the control unit 7 can determine the actual humidity of the oven inner cavity 3 by additionally receiving the temperature measurements from the temperature sensor 10b. This is may be useful in the context of aircraft, where the ambient temperature on board the aircraft at high altitude may not correspond to standard temperature, and may change during the course of the flight.

In other examples, the thermal transport properties of the heat pipe may change depending on the air pressure in the exterior space and/or the water vapour concentration in the exterior space. This is particularly the case when the aerospace galley insert is located on an aircraft, since the humidity and pressure of an aircraft at high altitude will differ from standard humidity and pressure, and thus referencing a heat pipe at standard pressure and humidity may be less accurate. For instance, the data in FIGS. 4 and 5, which was taken at standard ambient pressure and humidity, may not accurately reflect the behaviour of a heat pipe at a cabin pressure and humidity. Thus, one or both of these parameters can also be modelled as variables and associated empirical data can be gathered and stored in the look-up table. Then, pressure and water vapour concentration sensors can be included in the aircraft galley insert as previously described, such that the control unit can estimate the humidity based additionally on these measurements. This can obtain a more reliable humidity estimation.

The invention claimed is:

1. An aerospace galley insert comprising:
an oven defining therein an oven inner cavity for receiving food to be prepared;
a fluid supply for supplying fluid comprising water or water vapour to the oven inner cavity;
an exterior space defined outside of the oven inner cavity;
a heat pipe extending between the oven inner cavity and the exterior space, the heat pipe including a wick surrounding a vapour cavity, a casing and a working liquid, wherein the heat pipe is configured such that working liquid in the wick evaporates into the vapour cavity when a first end of the heat pipe is exposed to heat, migrate towards a second end of the heat pipe and condense back to a liquid;

a first temperature sensor located in the inner cavity and separate from the heat pipe for detecting a first temperature in the oven inner cavity;

a second temperature sensor located in the exterior space and separate from the heat pipe for detecting a second temperature in the exterior space;

a third temperature sensor on the heat pipe for detecting a third temperature of the heat pipe where it extends into the exterior space; and a control unit configured to determine an actual water vapour concentration in the oven inner cavity based on the first, second and third temperatures, and configured to control the fluid supply in order to adjust the actual water vapour concentration to a target water vapour concentration.

2. An aerospace galley insert as claimed in claim 1, wherein the target water vapour concentration is a water vapour molar fraction of at least 45.

3. An aerospace galley insert as claimed in claim 1, wherein the target water vapour concentration is a water vapour molar fraction of 45-75%.

4. An aerospace galley insert as claimed in claim 1, wherein the control unit is configured to adjust the actual water vapour concentration based on a measured ambient air pressure.

5. An aerospace galley insert as claimed in claim 4, wherein the control unit comprises an air pressure sensor for measuring the air pressure in the exterior space and so provide the measured ambient air pressure.

6. An aerospace galley insert as claimed in claim 1, wherein the heat pipe comprises titanium at least where it extends in the oven inner cavity.

7. An aerospace galley insert as claimed in claim 1, wherein the control unit is configured to determine the actual water vapour concentration in the oven inner cavity based on a measured water vapour concentration in the exterior space, and wherein the control unit comprises a water vapour concentration sensor for measuring the water vapour concentration in the exterior space and so provide the measured water vapour concentration.

8. An aerospace galley insert as claimed in claim 1, wherein the heat pipe comprises a first leg extending between the oven inner cavity and the exterior space, and a second leg extending in the exterior space and joined to the first leg by a bent portion, the second leg extending at least partly upwardly from the bent portion, and wherein the third temperature sensor is arranged to measure the temperature at the bent portion of the heat pipe.

9. An aerospace galley insert as claimed in claim 1, wherein no more than 20% of the length of the heat pipe is located in the oven inner cavity.

10. A method of managing water vapour concentration in an oven of an aerospace galley insert as recited in claim 1, the method comprising:

detecting a first temperature in the oven inner cavity;

detecting a second temperature in the exterior space;

detecting a third temperature of the heat pipe where it extends into the exterior space;

determining an actual water vapour concentration in the oven inner cavity based on the first, second and third temperatures; and controlling a supply of fluid to the oven inner cavity in order to adjust the actual water vapour concentration to a target water vapour concentration, the fluid comprising water or water vapour.

11. A method as claimed in claim 10, comprising measuring an ambient air pressure and adjusting the actual water vapour concentration based on the measured ambient air pressure.

12. A method as claimed in claim 10, comprising measuring a water vapour concentration in the exterior space, and determining the actual water vapour concentration in the oven inner cavity based on the measured water vapour concentration in the exterior space.

13. A method as claimed in claim 10, wherein the heat pipe comprises a first leg extending between the oven inner cavity and the exterior space, and a second leg extending in the exterior space and joined to the first leg by a bent portion, the second leg extending at least partly upwardly from the bent portion, and wherein the third temperature is the temperature of the bent portion of the heat pipe.

* * * * *